No. 811,410.  
PATENTED JAN. 30, 1906.  
C. J. KLEIN.  
MEANS FOR CONVERTING MOTION.  
APPLICATION FILED JAN. 4, 1905.
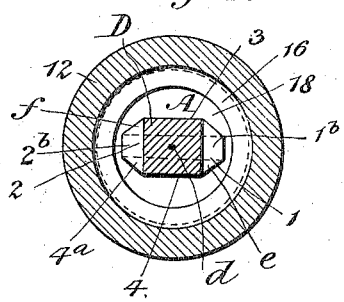
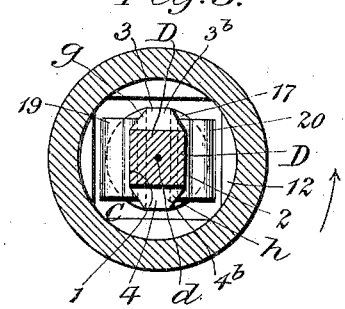
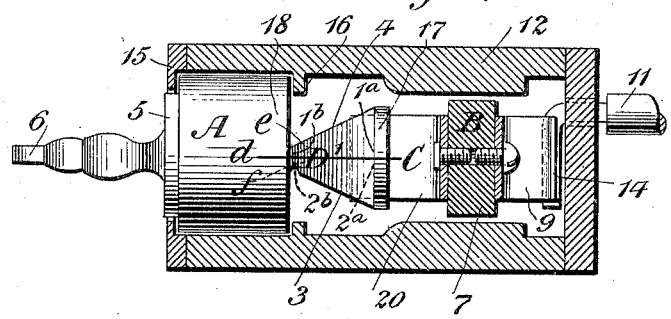
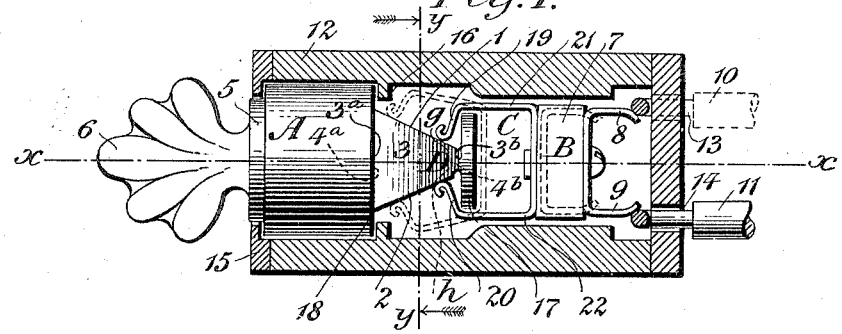
Witnesses:
Inventor:  
Charles J. Klein,  
By his Attorney.

UNITED STATES PATENT OFFICE.

CHARLES J. KLEIN, OF NEW YORK, N. Y., ASSIGNOR TO RALPH A. SCHOENBERG, OF NEW YORK, N. Y.

MEANS FOR CONVERTING MOTION.

No. 811,410.    Specification of Letters Patent.    Patented Jan. 30, 1906.

Application filed January 4, 1905. Serial No. 239,676.

*To all whom it may concern:*

Be it known that I, CHARLES J. KLEIN, a citizen of the United States, residing in the borough of Manhattan, in the county of New York, city and State of New York, have invented certain new and useful Improvements in Means for Converting Motion, of which the following is a specification.

This invention relates broadly to means for converting motion and specifically to means for converting rotary into reciprocatory or rectilinear movement; and it has for its object to provide mechanical means of this character which will be relatively simple and inexpensive in construction, positive and speedy in operation, and generally superior in efficiency and which will be particularly adapted for use in connection with electrical-circuit making and breaking apparatus, door and other locks, and a wide range of mechanisms in which quick and positive movement is required together with a temporary locking of the parts and members in positions assumed.

In carrying out the invention I provide two members having different motions and which operate together in such bearing relation or operative connection that the motion of one member when actuated is converted into a different motion of the other member.

I am well aware that various means have been devised and used for converting motion, one of such means consisting of a reciprocatory member having a face broken up into alternate elevations and depressions and a rotary member which bears upon the said broken face of the reciprocatory member to reciprocate the latter. In this form of means the rotary member bears upon the reciprocatory member in a circular track around the axis of rotation of the rotary member, whereas according to my invention I provide a body of peculiar formation which may be rotary and which is provided with a plurality of operative bearing-points arranged or grouped around the central axis or axis of rotation of said body in such positions that the converting of the motion of the member constituted by said body or the conversion of the motion of another member bearing upon or operatively connected with said body is caused by the bearing of said members one upon the other or the operative connection of one of said members with the other at or upon said bearing-points with said bearing-points interposed between the central axis or axis of rotation of said body and the other member. The construction of means of the character described according to the invention because of the possible integrality of the peculiarly-formed body constituting one member of the means and because of the possible confinement within extremely relatively small dimensions of said peculiarly-formed body constituting one member of said means permits of a resultant device or mechanism embodying the invention being extremely compact in form and relatively inexpensive in production and particularly free from liability to become displaced or out of order in any of its working parts.

In the drawings, Figure 1 is a longitudinal side view of an electrical-circuit maker and breaker comprising the invention, the casing being shown sectioned to disclose the working parts. Fig. 2 is a longitudinal sectional view of the same, taken upon the line $x\,x$, Fig. 1. Fig. 3 is a transverse sectional view of the same, taken upon the line $y\,y$, Fig. 1, and looking in the direction of the arrow at the top of the sheet; and Fig. 4 is a similar view looking in the direction of the arrow at the bottom of the sheet.

Corresponding parts in all the figures are denoted by the same reference characters.

Referring with particularity to the drawings, the improved means comprise two members A and B, one of which is the rotary member and the other of which is the reciprocating member, A being the former and B the latter in the construction illustrated. The members A and B operate together under the influence of a tension member C, which in the construction illustrated serves as the operative connection between the two members A and B. One of the members, A, embodies a rotary body D, having an axis of rotation $d$ and two or more lateral operative bearing-points arranged in different planes at the sides of said axis $d$, four of said operative bearing-points $e, f, g$, and $h$, respectively, being illustrated and all arranged to rotate around the common axis $d$. In the construction illustrated the surface of the body D is formed into a plurality of lateral diversely-inclined operative facial portions 1, 2, 3, and 4, respectively, all grouped around the axis of rotation $d$, and the other member B in the operation of the device is alternately or successively engaged with said inclined portions to produce reciprocation of one member in the rotation of the other member. The operative bearing-points $e, f, g$, and $h$ are respectively embraced within the operative surface portions 1, 2, 3, and 4. In the present illustration the member B is engaged with the member A through the instrumentality of the tension member C, which engages alternately and jointly with the inclined portions 1 and 2 and with the inclined portions 3 and 4, the inclined portions 1 and 2 having a mutual convergence and the inclined portions 3 and 4 having a mutual convergence. The peculiar formation of the body D causes the tension member C and the member B to be thrown back and forth or to reciprocate upon rotation of the body D, the tension member C moving successively over the several operative facial portions of the body D in opposition to said facial portions with said facial portions interposed between said tension member C and the axis of rotation $d$ of the body D.

In the specific form of construction illustrated in the drawings the rotary member A comprises the stem 5 of a key or finger-piece 6, and the reciprocating member B comprises a contact-head 7, carrying contact-points 8 and 9, which are arranged to be electrically engaged with and disengaged from electrical circuit members 10 and 11.

The specific form and operative arrangement and connection of parts and members in an embodiment of the invention in an electrical circuit maker and breaker such as illustrated is as follows: The key-stem 5 and the contact-head 7 are inclosed within a tubular casing 12, from one end of which projects the key or finger-piece 6, the circuit members 10 and 11 entering said casing 12 at the opposite end of the same and being there held in place, as at 13 and 14. The stem 5 is rotatably mounted in the casing and prevented from endwise movement by internal flanges or stops 15 and 16. The contact-head 7 fits slidably within the casing 12, so as to move toward and away from the stem 5, and is prevented from rotary movement by being squared, the corresponding end of the casing 12 being interiorly squared to fit the contact-head 7.

The body D is formed upon or connected with the inner end of the stem 5 and terminates at each end in a laterally-flaring flange 17 and 18, respectively, the faces of which flanges are arranged in opposition with the inclined portions 1, 2, 3, and 4 of the body D extending between them. These inclined portions are facial, alternately oppositely inclined, and connecting, and the portions 1 and 2 converge toward the flange 17, the portions 3 and 4 converging toward the flange 18. Continuing around the body D, the facial portions 1, 3, 2, and 4 are arranged in the order named, and it results from the scheme of convergence of the same above described, together with the arrangement last recited, that the said facial portions are all substantially triangular in shape, the triangular portions 1 and 2 having their bases $1^a$ and $2^a$ merged into the flange 17 and their apices $1^b$ and $2^b$ merged into the flange 18 and the triangular portions 3 and 4 having their bases $3^a$ and $4^a$ merged into the flange 18 and their apices $3^b$ and $4^b$ merged into the flange 17. The operative bearing-points $e, f, g$, and $h$ are substantially in coincidence with the apices $1^b$, $2^b$, $3^b$, and $4^b$, respectively. By the arrangement and formation of the facial portions 1, 2, 3, and 4 it is manifest that the bases $3^a$ and $4^a$ extend in angular relation to the bases $1^a$ and $2^a$.

The contact-head 7 carries the tension member C, which consists of two opposed and spaced plates 19 and 20, which are held in tensional engagement with the facial portions 1 and 2 or 3 and 4 of the body D by spring-arms 21 and 22, connected with the contact-head 7. The plates 19 and 20 are thus free for relative tensional movement, and the arms 21 and 22 are of proper proportions to permit the contact-head 7 to reciprocate inward of the body D as said plates 19 and 20 ride over the facial portions of said body, as will be hereinafter described.

The operation, method of use, and advantages of the improvements constituting the invention will be readily understood from the foregoing description, taken in connection with the accompanying drawings and the following statement. The plates 19 and 20 of the tension member C constantly tend to approach each other, bearing tensionally upon the body D. With the parts and members in the positions illustrated in the drawings the contact-points 8 and 9 are held in engagement with the circuit members 10 and 11 to maintain a closed circuit, the plates 19 and 20 being in engagement or substantially in engagement with the flange 17 and being held in this position by the converging portions 1 and 2 of the body D and with the base portions $1^a$ and $2^a$ of the same. If now the stem 5 be turned by the key 6 in the direction denoted by the arrow in Fig. 3, the plates 19 and 20 will be gradually forced apart, the contact-head and said plates being incapable of turning until the central portions of said plates ride onto the apices $3^b$ and $4^b$ or operative bearing-points $g$ and $h$ of the portions 3 and 4, when because of the convergence of the portions 3 and 4 toward the bases $3^a$ and $4^a$ of the same the tension of the arms 21 and 22 will cause the plates 19 and 20 to traverse the portions 3 and 4 to the bases $3^a$ and $4^a$ of the latter and into engagement with the flange 18. This movement of the plates 19 and 20 retracts the contact-head 7 and withdraws the contact-points 8 and 9 from the circuit members 10 and 11, breaking the electrical circuit. If now the key 6 and stem 5 be again turned in the same direction, the plates 19 and 20 will again gradually be forced apart until their central portions ride onto the apices $1^b$ and $2^b$ or operative bearing-points $e$ and $f$ of the portions 1 and 2, when because of the convergence of the portions 1 and 2 toward the bases $1^a$ and $2^a$ of the same the tension of the arms 21 and 22 will cause the plates 19 and 20 to traverse the portions 1 and 2 to the bases $1^a$ and $2^a$ of the latter and into engagement with the flange 17. This movement of the plates 19 and 20 advances the contact-head 7 and forces the contact-points 8 and 9 into engagement with the circuit members 10 and 11, again making an electrical circuit, the parts and members being now again in the positions illustrated in the drawings. The positions of the parts of the member B when the electrical circuit is broken in the manner above described is denoted in dotted lines in Fig. 1. It will be noted that the traversing of the converging inclined facial portions of the body D by the tension member C transpires immediately after the latter has been subjected to the highest tension by separation of the plates 19 and 20, which brings the latter plates onto two of the operative bearing-points $e$ and $f$ or $g$ and $h$. Hence the action of the tension member in this traversing movement and in the actuation of the contact-head 7 is speedy, the resultant quick making and breaking of the electrical circuit being highly advantageous and desirable. This traversing movement further takes place after and independent of the rotation of the stem 5 and the key 6. It will also be noted that after a complete actuation of the members, resulting in the movement of the contact-head into either circuit-making or circuit-breaking position, the latter is positively locked in such position by the grip of the tension member upon the body D until the key 6 is again turned. The same operative effects may be obtained by turning the key 6 in either direction, as will be manifest. It is also manifest that were the member B rotatively mounted and the member A mounted for reciprocation the latter might as operatively be reciprocated by rotation of the former and the tension member C.

The operative features of positive temporary locking and the production of speedy phases of reciprocatory movement under the actuation of a rotary element adapt the invention broadly to a wide range of uses.

Because of the peculiar formation of the body D comprised within the member A it will be noted that the plates 19 and 20 traverse the facial portions 1, 2, 3, and 4, which are grouped around the axis $d$ of rotation of the body D, with said axis of rotation between said plates 19 and 20, and that the commencement of each such traversing movement by the plates 19 and 20 follows the engagement of the bearing-points $e$ and $f$ or $g$ and $h$ substantially at the apices $1^b$ and $2^b$ or $3^b$ and $4^b$ of the facial portions 1 and 2 or 3 and 4, such bearing-points being interposed between the plates 19 and 20 and the axis of rotation $d$.

The operative bearing-points $e$ and $f$ being included in the operative facial portions 1 and 2, which are at opposite sides of the plane of the axis $d$ of the body D, and the operative bearing-points $g$ and $h$ being included in the operative facial portions 3 and 4, which are at opposite sides of the planes of the axis $d$ of the body D, it is manifest that the operative bearing-points $e$ and $g$ are necessarily arranged in different planes at the sides of said axis $d$ and the operative bearing-points $f$ and $h$ are arranged in different planes at the sides of said axis $d$. The tension member C acts simultaneously upon the bearing-points $e$ and $f$ in one actuation of the member A and simultaneously upon the bearing-points $g$ and $h$ in the succeeding actuation of the member A. The plane relation of the bearing-points $e$, $f$, $g$, and $h$ shares importance with the scheme of arrangement of the bearing-points whereby they are operatively engaged by the member B or tension member C with such bearing-points interposed between the axis of rotation or central axis of the body D and said member B or tension member C.

It is desired to particularly point out that especially in the body D and the peculiar formation of the same reside the elements of novelty and efficiency concerned in the present invention. Said body D has nothing in common with the characteristics of a threaded shaft or any other well-known mechanical element. It is a body of varying transverse sectional areas and angularly-disposed smooth operative surface or facial portions. The conversion of the motion resulting from the joint operation and coengagement of said body D and the member B through the instrumentality of the tension member C is caused by the peculiar action of the surface or facial portions of the body D upon the tension member C, and the phases of reciprocation of the member B are instituted by the body D alone without the employment of any independent means for causing a reversal of motion by connecting or disconnecting operative elements and setting up new working adjustments. The same would be true if the body D were caused to reciprocate by rotation of the member B. No reversing, tripping, shifting, or other equivalent means is employed for changing the working conditions at the ends of the phases of motion of the actuated member.

Having thus described my invention, I claim and desire to secure by Letters Patent—

1. Improved means of the character described, comprising two members having different motion; one of such members comprising a body provided with a plurality of operative relatively angularly disposed facial portions grouped about a central axis of said body; and the other of said members being arranged to be directly operatively engaged with said facial portions in such arrangement that said facial portions are interposed directly between said latter member and said axis of said other member.

2. Improved means of the character described, comprising two members having different motion; one of said members comprising a body of varying transverse sectional areas and provided with a plurality of operative relatively angularly disposed facial portions grouped about a central axis of said body; and the other of said members being arranged to be operatively engaged with said facial portions in such arrangement that said facial portions are interposed directly between said latter member and said axis of said other member.

3. Improved means of the character described, comprising two members having different motion; one of said members comprising a body provided with a plurality of operative relatively angularly disposed smooth facial portions grouped about a central axis of said body; and the other of said members being arranged to be directly operatively engaged with said smooth facial portions in such arrangement that said facial portions are interposed directly between said latter member and said axis of said other member.

4. Improved means of the character described, comprising a rotary member, a tension member, and a reciprocating member; said tension member being connected with one of said other members, and comprising two tensionally relatively separable portions; and the other of said other members being provided with a plurality of diversely-inclined operative portions with which said tension member is engaged.

In witness whereof I have signed my name to this specification in the presence of two subscribing witnesses.

CHARLES J. KLEIN.

Witnesses:
NAT B. BLUM,
F. STILLE.